United States Patent
Lundström et al.

(10) Patent No.: US 6,654,599 B1
(45) Date of Patent: Nov. 25, 2003

(54) CALL CHARGES IN A TELECOMMUNICATIONS NETWORK

(75) Inventors: Johan Lundström, Pargas (FI); Matti Halkosaari, Turku (FI)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 09/560,502

(22) Filed: Apr. 27, 2000

(30) Foreign Application Priority Data

Apr. 29, 1999 (GB) .............................................. 9909865

(51) Int. Cl.[7] .............................................. H04M 11/00
(52) U.S. Cl. ...................... 455/405; 455/406; 455/407; 455/408; 379/411; 379/144.01; 379/144.06; 379/144.08; 379/114.01; 379/144.09
(58) Field of Search ................................ 455/405, 406, 455/407, 408; 379/411, 144.01, 144.06, 144.08, 114.01, 114.02, 114.09, 114.12

(56) References Cited

U.S. PATENT DOCUMENTS 6,104,792 A * 8/2000 Lautenschlager et al. ... 379/130
6,263,058 B1 * 7/2001 Lautenschlager et al. ..................... 379/114.29
6,408,174 B1 * 6/2002 Steijer ........................ 455/407

FOREIGN PATENT DOCUMENTS

| EP | 0 751 662 A2 | 1/1997 |
| GB | 2 294 611 A | 5/1996 |
| WO | WO 94/28670 A1 | 12/1994 |

OTHER PUBLICATIONS

Strayton, A.; UK Patent Office Search Report under Section 17, dated Jul. 6, 1999, for British Appl. No. GB 9909865.9, pp. 1–2.

* cited by examiner

Primary Examiner—William Trost
Assistant Examiner—Danh C Le
(74) Attorney, Agent, or Firm—Jenkens & Gilchrist, P.C.

(57) ABSTRACT

A method of providing call tariff information to a subscriber coupled to a telecommunications network 1, where the call tariff information relating to a call from a terminal 9 of the subscriber to a B-number 13. The method comprising sending a subscriber initiated call tariff enquiry from the subscriber terminal 9 to the telecommunications network 1 over a signalling channel, the enquiry including at least a part of said B-number or an identification of the B-number. Call tariff information relating to said call is determined at the network 1 and sent from the network 1 to the subscriber terminal 9 over said signalling channel. The call tariff information is then presented to the subscriber on a display 11 of the subscriber terminal 9.

13 Claims, 2 Drawing Sheets

CALL CHARGES IN A TELECOMMUNICATIONS NETWORK

FIELD OF THE INVENTION

The present invention relates to call charges in a telecommunications network and more particularly to the provision of call charge information to telephone subscribers of a telecommunications network.

BACKGROUND OF THE INVENTION

In the deregulated telecommunications markets which now exist in many countries, several telecommunications network operators compete with one another for caller business. A caller is often able to choose, on a call-by-call basis, which operator he or she wishes to use. More often than not, a caller would like to choose the cheapest operator for a given call. However, call tariffs published by operators are often complicated and difficult to apply. It may often be the case that a caller is either not able to apply the tariff correctly or does not bother to apply the tariff at all. He may therefore end up using a relatively expensive operator.

In certain telecommunications networks, there are available services which advise callers of the cost (either in monetary terms or in terms of chargeable call units) of a call either when the call is terminated or during the call.

SUMMARY OF THE INVENTION

The inventor of the present invention has recognised that there is a demand for call tariff information prior to the making of a telephone call and in a form that is readily comprehendible to the general public, such that a caller may make an informed decision over whether or not to proceed with a call. This demand is not currently being met by operators who merely provide call charge information during an ongoing call (or upon termination of a call) as by the time the caller is presented with the information he has already selected an operator and is unlikely to terminate the call in an attempt to locate a cheaper operator.

It is an object of the present invention to overcome or at least mitigate the disadvantages of known systems for advising telephone network subscribers of tariff and charge information. This and other objects are met, at least in part, by transmitting call tariff information to a subscriber's terminal upon request, prior to the commencement of a telephone call.

According to a first aspect of the present invention there is provided a method of providing call tariff information to a subscriber coupled to a telecommunications network, the call tariff information relating to a call from a terminal of the subscriber to a B-number, the method comprising the steps of:

sending a subscriber initiated call tariff enquiry from the subscriber terminal to the telecommunications network over a signalling channel, the enquiry including at least a part of said B-number or an identification of the B-number;

determining at the network call tariff information relating to said call;

sending the determined call tariff information from the network to the subscriber terminal over said signalling channel; and presenting the call tariff information to the subscriber via presentation means of the subscriber terminal.

Embodiments of the present invention enable call tariff information to be provided to network subscribers in a readily understandable form, without the need to actually initiate a call and thus without incurring the costs involved in a call. Subscribers are able to make informed decisions regarding which operator to use for a given call and operators are able to compete on the basis of price in the knowledge that price information will be available to the subscribers in a form which they can readily comprehend. Moreover, embodiments of the invention enable up-to-date call tariff information to be provided to subscribers. Thus, operators may make available short term "special deals" depending for example upon dynamic factors such as current network availability.

Preferably, the telecommunications network which determines the call tariff information is the access network for the subscriber terminal. Alternatively however, the call tariff information may be determined at some other network/node. For example, the tariff may be determined at the enquiring subscriber's home network even if this is not the current access network.

The step of determining call tariff information may be carried out at an exchange (or switch) of the telecommunications network. The exchange may have available to it a database containing call tariffs of the network operator as well as call tariffs of "foreign" networks. In the event that the B-number is associated with a foreign network, the exchange is able to determine call tariff information without reference to foreign networks (of course if the B-number is associated with the access network then the same is also true). Alternatively, if such a database is not available to the exchange, the exchange may send call tariff information requests to the foreign network with which the B-number is associated as well as to any intermediate network(s) or exchanges.

Where ISUP protocols are used for inter-network signalling traffic, a tariff information request may be sent from the access network to a foreign network using an Initial Address Message (IAM). More particularly, the LAM may contain an indicator which indicates that the message relates to a call tariff request and is therefore not a normal call set-up initiation request. Upon receipt of an IAM containing a call tariff request indicator, the exchange in the foreign network responsible for charging the call in question (typically this is the local exchange associated with the B-number), as well as intermediate foreign networks/exchanges, returns its own tariffs. In order to prevent the actual establishment of a connection between the enquiring subscriber and the B-number, the local exchange of the B-number may respond to receipt of the IAM containing said indicator by releasing the call (after returning its tariff information). The release message is relayed back to the originating exchange via any intermediate exchanges.

The present invention may be advantageously employed in any suitable telecommunications network or combination of networks. For example, the networks may be GSM, ISDN, or PSTN network. In the case where the access network is a GSM network, the call tariff enquiry sent from the subscriber's terminal to the network may make use of Unstructured Supplementary Service Data (USSD). Alternatively, the enquiry may be sent using the short message service (SMS). In future GSM and related digital standards, the enquiry may be sent using Facility Information Elements (intended for supplementary service invocation). Typically, the call tariff information is returned from the network to the subscriber's terminal using the same protocol/service which is used to send the enquiry. In the case of ISDN subscribers, the enquiry and response may use the keypad protocol, i.e. Keypad Facility Information Elements and Display Information Elements. In the case of Euro ISDN, the enquiry and response may be sent using Facility Information Elements. In the case of PSTN, the enquiry may be sent using dialled keypad sequences and the response may be returned by way of a voice recording played to the subscriber over the terminal.

Preferably, call tariff information received at the mobile terminal is displayed on a display of the terminal. Alternatively however, the information may be played to the subscriber as a voice message. Other methods of presentation will also be apparent to the skilled person.

The call tariff information enquiry sent from the subscriber terminal may include the time and day/date at which the subscriber proposes to make the call. The tariff is determined at the network on the basis of this chronological information. In the event that the network needs to contact foreign networks to determine the tariff, the time and day/date information may be sent to the foreign networks.

According to a second aspect of the present invention there is provided a system for providing call tariff information to a subscriber coupled to a telecommunications network, where the call tariff information relates to a call from a terminal of the subscriber to a B-number, the system comprising a subscriber terminal and a telecommunications network, the subscriber terminal having means for sending a subscriber initiated call tariff enquiry over a signalling channel to the network, the enquiry containing at least a part of said B-number or an identification thereof, the network having means for determining call tariff information for said call and means for sending the determined call tariff information from the network to the subscriber terminal over said signalling channel, and the terminal further having means for presenting the determined call tariff information to the subscriber.

According to a third aspect of the present invention there is provided a terminal arranged in use to be coupled to a telecommunications network, the terminal comprising means for sending a subscriber initiated call tariff enquiry over a signalling channel to a telecommunications network, the enquiry containing at least a part of a B-number to which the subscriber wishes to call, means for receiving call tariff information from the network, and means for presenting the received call tariff information to the subscriber.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
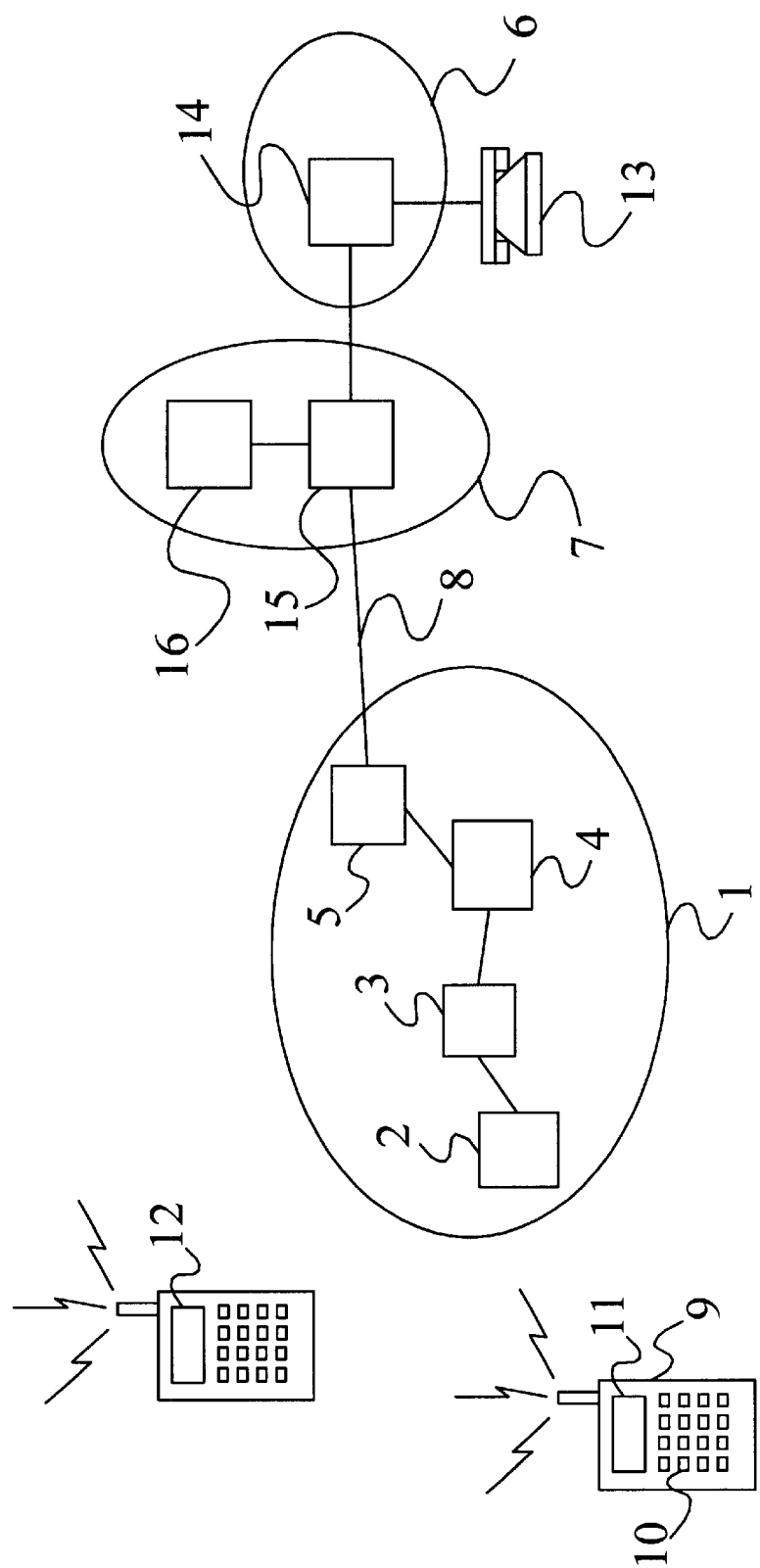
FIG. 1 illustrates schematically a telecommunications system.

There is illustrated in FIG. 1 a Global System for Mobile communications (GSM) mobile telephone network 1 comprising Base Stations (BSs) 2 and Base Station Controllers (BSCs) 3. The GSM network 1 comprises a Mobile Switching Centre (MSC) 4 which handles the routine of telephone calls within the network as well as other network control and management functions. The network 1 further comprises a Gateway MSC (GMSC) 5 which connects the network 1 to "foreign" networks 6,7 via national and international trunk lines 8.

There is illustrated in FIG. 1 an exemplary GSM mobile terminal 9 which in this instance is assumed to belong to a subscriber of the GSM network 1. The subscriber has inserted his subscriber identity module (SIM) card into the terminal 9 so that when the terminal 9 is switched on and is within the coverage area of one of the base stations 2 of the GSM network 1, the terminal 9 is able to register with the network 1.

Once the terminal 9 is registered with the network 1, the subscriber is able to send call tariff enquiries from the terminal 9 to the GSM network 1. To achieve this, the subscriber selects from the telephone's menu system a call tariff enquiry option using the terminal's keypad 10. The subscriber is then prompted by the terminal's display 11 to enter the B-number which he wishes to call and upon which the enquiry is to be based. Once the subscriber has correctly entered the B-number and pressed the "yes" key on the terminal's keypad 10, the terminal 9 transmits a call tariff enquiry message to the network using the Unstructured Supplementary Service Data (USSD) service (GSM 02.90). The message includes the selected B-number, although in certain cases only the national and/or international dialling prefix may be sent if this is sufficient to enable the call tariff to be determined. The call tariff enquiry is sent over a signalling channel of the GSM network 1, via the BS 2 currently covering the terminal and the controlling BSC 3, to the MSC 4.

In the event that the B-number belongs to a subscriber of the same GSM network 1 and that subscriber's terminal 12 is currently at home, and the network 1 is also the home network of the enquiring subscriber, the MSC 4 is able to determine the call tariff for a call between the two terminals 9,12 from its own tariff record. However, if the B-number belongs to a foreign network 6, it will generally be necessary for the MSC 4 to contact the foreign network 6, and in this case the intermediate networks 7 between the GSM network 1 and the foreign network 6 via which the call would have to be routed, to obtain all the information needed to determine the final tariff.

Assuming that the B-number does indeed belong to the foreign network 7 (and is allocated to a terminal 13), the MSC 4 of the GSM network 1 sends the ISDN User Part (ISUP) Initial Address Message (IAM) to the local exchange 14 to which the B-number is attached. The IAM is relayed via a Service Switching Point (SSP) 15 of the intermediate network 7. The IAM is modified as compared with existing specifications to include a new indicator which identifies the IAM as relating to a called tariff enquiry. Both the SSP 15 and the destination exchange 13=4 respond to receipt of this IAM by returning a message to the originating MSC 4 which contains the particular tariffs which respective operators will apply to the call (t2 and t3). The return message is preferably an application transport message (ATM), ETSI Standard ES201 296 V1.1.2. It is noted that the tariff enquiry at the SSP 15 may be referred to a Switching Control Point (SCP) 16. The tariff is then returned to the SSP 15 using the Intelligent Network Application Part message SendCharginglnformation.

In addition to returning a tariff message, the destination exchange 14 recognises that the IAM does not require the completion of the call and, after the ATM has been sent, releases the call. However, the tariffs t2 and t3 have by this time been returned to the originating MSC 4 which is able to combine these with its own tariff t1 to determine the total tariff for the call. The tariff, e.g. cost per minute, is then returned to the enquiring subscriber's terminal 9 over a signalling channel where it is displayed on the terminal's display 11.

Figure 2:
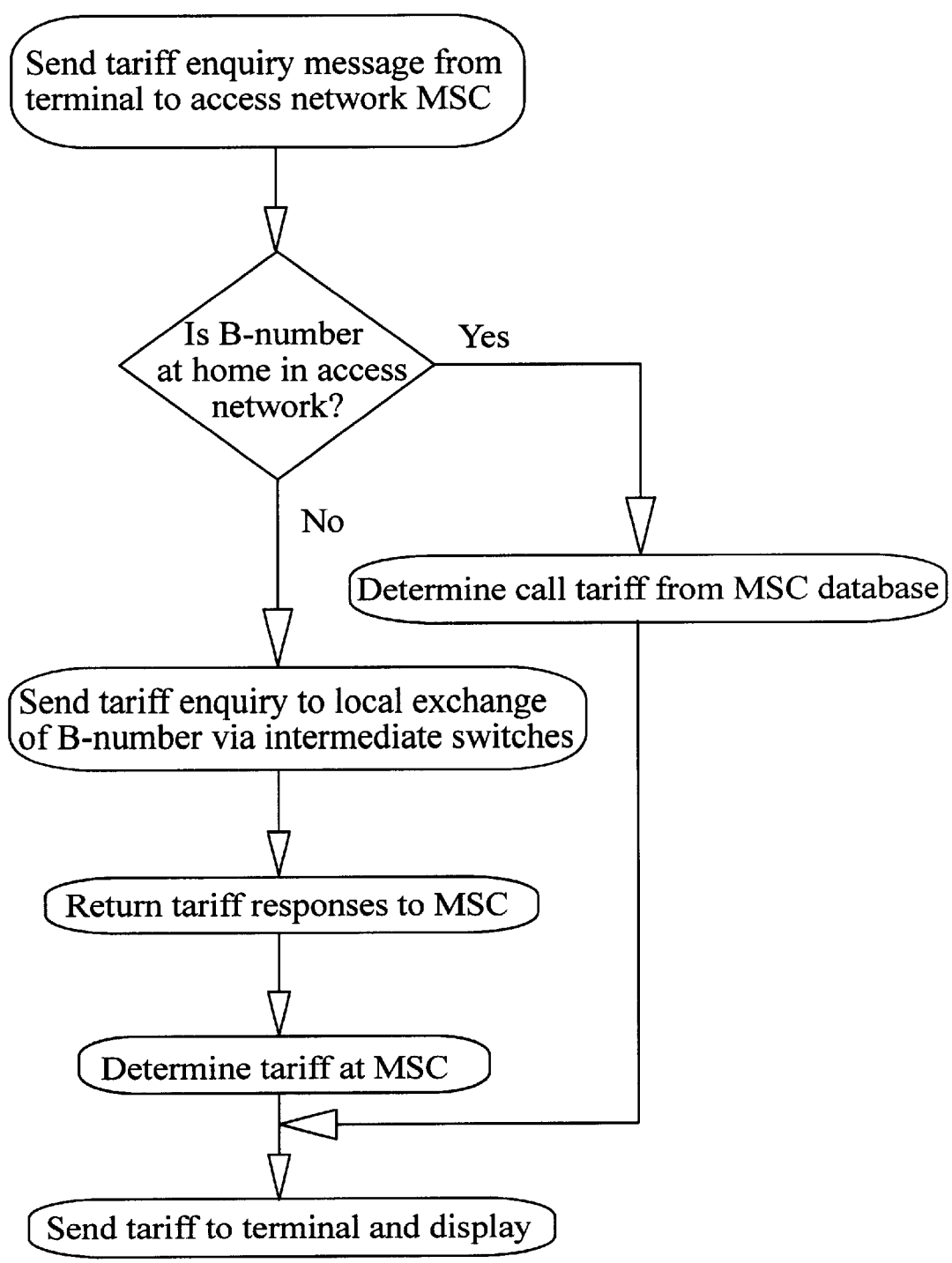
FIG. 2 is a flow diagram illustrating a method of providing call tariff information to a subscriber in the system of FIG. 1.

The method of providing tariff information to a subscriber as described above is further illustrated by a way of a flow diagram of FIG. 2.

It will be appreciated by the person of skill in the art that modifications may be made to the above described embodiment without departing from the scope of the present invention. For example, in place of the INAP protocol, a CAMEL protocol may be used to carry tariff enquiry messages between networks and network nodes (CAMEL is a version of INAP intended for mobile networks).

What is claimed is:

1. A method of providing call tariff information to a subscriber coupled to a telecommunications network, the call tariff information relating to a call from a terminal of the subscriber to a B-number associated with a foreign network, the method comprising the steps of:

sending a subscriber initiated call tariff enquiry from the subscriber terminal to the telecommunications network over a signalling channel, the enquiry including at least one of a part of the B-number and an identification of the B-number;

determining at the telecommunications network call tariff information relating to the call including sending a call tariff information request to the foreign network with which the B-number is associated, thereby determining additional tariffs of the foreign network;

sending the determined call tariff information from the telecommunications network to the subscriber terminal over the signalling channel; and presenting the call tariff information to the subscriber via the subscriber terminal.

2. A method according to claim 1, wherein the telecommunications network which determines the call tariff information is the access network for the subscriber terminal.

3. A method according to claim 1, wherein the call tariff information is determined at a network which is not the access network.

4. A method according to claim 1, wherein the step of determining call tariff information is carried out at an exchange or switch of the telecommunications network.

5. A method according to claim 4, wherein the exchange or switch has available to it a database containing call tariffs of the network operator as well as call tariffs of a plurality of foreign networks.

6. A method according to claim 1, wherein a local exchange of the B-number releases the call after returning a tariff message.

7. A method according to claim 1, wherein the telecommunications network is one of a GSM, ISDN, and PSTN network.

8. A method according claim 1, wherein the call tariff information received at the subscriber terminal is displayed on a display of the subscriber terminal.

9. The method of claim 1, wherein the tariff information request is included in an ISDN User Part (ISUP) Initial Address Message (IAM).

10. The method of claim 9, wherein the Initial Address Message (IAM) includes an indicator which indicates that the Initial Address Message (IAM) relates to a call tariff request.

11. A system for providing call tariff information to a subscriber coupled to a telecommunications network, where the call tariff information relates to a call from a terminal of the subscriber to a B-number associated with a foreign network, the system comprising:

a subscriber terminal; and a telecommunications network, the subscriber terminal having means for sending a subscriber initiated call tariff enquiry over a signalling channel to the telecommunications network, the call tariff enquiry containing at least one of a part of the B-number and an identification of the B-number, the telecommunications network comprising:

means for determining call tariff information for the call, the means for determining call tariff information comprising means for sending a call tariff information request to the foreign network with which the B-number is associated; and means for sending the determined call tariff information from the telecommunications network to the subscriber terminal over the signalling channel, the subscriber terminal further having means for presenting the determined call tariff information to the subscriber.

12. The system of claim 11, wherein the tariff information request is included in an ISDN User Part (ISUP) Initial Address Message (IAM).

13. The system of claim 12, wherein the Initial Address Message (IAM) includes an indicator which indicates that the Initial Address Message (IAM) relates to a call tariff request.

* * * * *